United States Patent [19]

Pachschwöll

[11] Patent Number: 4,540,114
[45] Date of Patent: Sep. 10, 1985

[54] APPARATUS FOR SOLDERING WORKPIECES

[75] Inventor: Heino Pachschwöll, Twistetal-Nieder-Waroldern, Fed. Rep. of Germany

[73] Assignee: Zevatron GmbH Gesellschaft fur Fertigungseinrichtungen der Elektronik, Arolsen, Fed. Rep. of Germany

[21] Appl. No.: 480,057

[22] Filed: Mar. 29, 1983

[30] Foreign Application Priority Data

Apr. 2, 1982 [DE] Fed. Rep. of Germany ....... 3212440

[51] Int. Cl.³ .............................................. B23K 1/08
[52] U.S. Cl. .................................... 228/37; 228/180.1
[58] Field of Search .................. 228/36, 37, 38, 180 R

[56] References Cited

U.S. PATENT DOCUMENTS

| 3,058,441 | 10/1962 | Walker et al. | 228/33 |
| 3,589,590 | 6/1971 | Fitzsimmons | 228/37 |
| 3,705,457 | 12/1972 | Tardoskegyi | 228/36 |
| 3,825,994 | 7/1974 | Coleman | 228/37 |
| 3,990,621 | 11/1976 | Boynton et al. | 228/37 |
| 4,101,066 | 7/1978 | Corsaro et al. | 228/37 X |
| 4,171,761 | 10/1979 | Boldt et al. | 228/37 |
| 4,285,457 | 8/1981 | Kondo | 228/36 |
| 4,410,127 | 10/1983 | Bodewig | 228/37 X |
| 4,433,805 | 2/1984 | Kanno | 228/180 R |
| 4,447,001 | 5/1984 | Allen et al. | 228/37 |

Primary Examiner—Kenneth J. Ramsey
Assistant Examiner—M. Jordan
Attorney, Agent, or Firm—Townsend and Townsend

[57] ABSTRACT

An apparatus for soldering workpieces (29) has a main solder bath (20) with a main solder wave (15) and the workpiece (29) is brought into contact with the surface of the main solder wave. The surface can be modulated by means of at least one additional solder outlet or inlet nozzle (11), in order to solder even densely packed circuit boards without problem and with complete wetting of all solder locations (FIG. 1).

31 Claims, 4 Drawing Figures

APPARATUS FOR SOLDERING WORKPIECES

BACKGROUND OF THE INVENTION

The invention relates to an apparatus for soldering workpieces, and preferably for soldering circuit boards and substrates which are equipped with electronic chips and/or micro components and/or sub-assemblies comprised thereof, the apparatus comprising a main solder bath, or at least a main solder wave, having a surface with which the workpiece is brought into contact.

For workpieces with very dense component packing, such as particularly occurs with circuit boards equipped with chips and with $Al_2O_3$ substrates the problem exits, both with wave and bath soldering, that all the locations to be soldered must be reached by the solder in the required manner.

As a result of capillary action, and of the flux inclusions and the air pockets which form due to the close arrangement of the components, and also as a result of inadequate adhesive action of the relatively small area solder support points, the wetting of the areas to be soldered with the passive or mobile solder is either not possible or only very inadequate when using the previously known methods.

The wetting is made more difficult by the alloys increasingly used for surface coatings on the substrates and on the components, which are often compounds of nickel or palladium.

It is already known to provide the main solder wave with a specified structure by using a control plate (German laying open prints DE-OS No. 24 58 203 and DE-OS No. 24 55 629). Attempts have also been made to allow several soldering waves to act one after the other on the lower side of a workpiece which is moved over the waves (East German patent specification DD-PS No. 134 437, European patent publication No. 55323). All these known arrangements do not however solve the problem that with dense component packing non-soldered passages regularly occur due to inclusions of air or flux.

The problem underlying the present invention is thus to provide an apparatus for soldering workpieces of the initially named kind with which even closely packed circuit boards can be soldered without problem and with complete wetting of all the locations to be soldered.

In order to solve this problem the invention envisages that the surface of the main solder bath, or of the main solder wave should have at least one outwardly projecting lobe.

SUMMARY OF THE INVENTION

It is particularly advantageous if several lobes are arranged spaced apart in a row.

In an apparatus in which the workpieces are conveyed over the main solder bath, or over the main solder wave, with their lower sides being brought into contact with the solder the apparatus should be arranged, in accordance with the invention, so that the row of lobes extends substantially at right angles to the conveying direction.

The thought underlying the invention is thus to be seen in the fact that the lower side of the workpiece to be soldered is brought into contact with lobes of the solder bath which fall away on all sides. On guiding a workpiece above such lobes the air pockets and any flux which is present are given the opportunity to move out of the way of the approaching liquid solder. In this way complete and uniform soldering is achieved even if the components are densely packed.

As a result of this construction the surface form of the melt, which is defined by cohesive binding and corresponding surface tension, is so modified by means of additionally introduced flow energy that local penetration of the solder into capillary cavities, so-called nests and caverns, is made possible. The modulation of the surface should accordingly be matched to the workpiece which is to be processed. It is particularly important that small convex solder surfaces of large curvature should be created on the solder melt by modulation of the surface, with the convex solder surfaces preferably coming into intimate contact with the individual contours of the components at an elevated flow velocity.

An advantageous and practical embodiment is characterised in that the lobes are formed by additional solder outlet or inlet nozzles.

The modulation of the surface is primarily produced by the solder emerging from the additional solder outlet nozzles. It is however fundamentally also possible for solder to be sucked from the main solder bath or the main solder wave through solder outlet nozzles, which then results in a depression in the surface.

Advantageous further developments of the invention are characterised in the subordinate claims.

It is possible, as a result of the possibility of individually controlling the main and auxiliary solder systems which are arranged one within the other, to obtain both the necessary wetting by corresponding surface roughness of the solder melt on the one hand and also the required sharp contours as the workpiece breaks away from the calmed part of the solder melt.

As a result of the fact that one is dealing with a combination of two self-sufficient soldering systems it is possible to obtain one desired effect (for example a particularly calm surface at the breakaway point between the workpiece and the solder melt) without incurring penalties in respect of the opposite effect (for example desired turbulence). In other words it is a particular advantage that the main and auxiliary solder systems can be controlled independently of one another in accordance with the invention. As the parameters can be continuously changed it is possible to provide automatic and individual control—in each case related to the soldering task in hand—for example via a coding system.

As a result of periodic horizontal movement of the solder outlet or inlet nozzles, and the resulting horizontal alternating movement of the lobes modulated onto the surface at right angles to the conveying direction, direct wetting of neighbouring positions on the workpiece is possible without the adhesion being interrupted, so that wetting does not always need to be started anew as is the case with pulsed systems.

The amplitudes of the lobes are preferably periodically variable. The variation is however expediently non-synchronous, i.e. does not take place with the same phase, in such a way that a wave-like movement of the lobe arrangement occurs which progresses in the lateral direction. This pulsing of the lobe ensures a particularly effective driving out of air or flux inclusions. It is particularly expedient if the periodic horizontal movement of the nozzles and the change of the amplitudes are used in combination.

Using the method described here it is possible, while satisfying the previously named requirements and preconditions, to process sub-assemblies under known operating conditions with operating materials which belong to the process. The use of operating materials which are foreign to the process, such as for example the introduction of gases and the subdivision of the joining process into separate steps, is not necessary. If the need should arise to introduce additional materials into the melt, (such as surface tension reduced oils, fluxes or gas components), for example with a view to favourably influencing the surface tension of the solder melt, then it is possible to introduce the required doses via the auxiliary soldering system.

BRIEF DESCRIPTION OF THE DRAWING

The invention will now be described in the following by way of example and with reference to the drawings which show.

DESCRIPTION OF THE PREFERRED EMBODIMENTS

Figure 1:
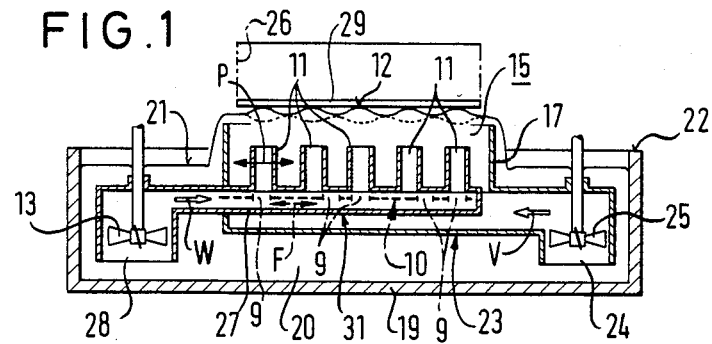
FIG. 1 a partly sectioned schematic front view of a first embodiment of an apparatus in accordance with the invention for soldering workpieces, FIG. 2 a partly sectioned side view of this embodiment, FIG. 3 a partly sectioned side view of a modification of the embodiment of FIGS. 1 and 2, and FIG. 4 a partly sectioned schematic side view of an embodiment of the apparatus of the invention for soldering workpieces which operates with a passive soldering bath.
Figure 2:
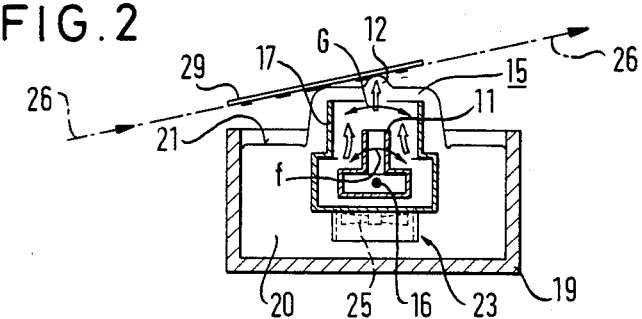

In FIGS. 1 and 2 a solder melt 20 is accommodated in a container 19. The surface 21 of the melt lies clearly beneath the upper edge 22 of the container 19.

A main soldering system 23 is accommodated inside the container 19 and consists of a pump aggregate 25 having a lower opening 24 and a main soldering nozzle 17 fed by the pump aggregate 25, with the main soldering nozzle projecting vertically upwardly and distinctly above the surface 21 of the solder melt and having a rectangular cross-section. The solder is sucked from the solder melt 20 by a suitable drive (not illustrated) for the pump aggregate 25 and is supplied in accordance with the arrow V shown in FIG. 1 to the main solder outlet nozzle 17. The solder thereby flows over the sidewalls of the main solder outlet nozzle 17 in the illustrated manner and projects at the top, as is customary with wave soldering, above the solder outlet nozzle 17. The workpiece is guided along a path 26 illustrated by chain-dotted line over the main solder outlet nozzle 17 where it comes into contact with the main solder wave 15.

In accordance with the invention additional solder outlet or inlet nozzles 11 of round cross-section are arranged alongside each other inside the main solder outlet nozzle 17 which extends the lateral direction over the width of the workpieces 29. The additional solder outlet or inlet nozzles 11 open beneath the upper edge of the main solder outlet nozzle 17 and all have the same height. A total of five auxiliary nozzles 11 are arranged spaced apart alongside each other. They are fed via a tube 27 from a second pump aggregate 13 which likewise has a suction opening 28 which opens downwardly relative to the solder melt 20. In this manner an auxiliary soldering system 31 is provided within the main soldering system 23.

By setting the second pump aggregate in operation via a drive (not shown), so that the solder melt is supplied in the sense of the arrow W to the nozzles 11, additional solder emerges from the upper ends of the nozzles 11. This produces laterally spaced apart lobes 12 on the main solder wave 15 as illustrated in detail in FIG. 1. By reversing the drive of the pump aggregate 13, i.e. by sucking solder from the main solder wave 15 into the nozzles 11, it would be possible to obtain a modulation in accordance with the broken line illustration in FIG. 1.

By preferably periodic horizontal to and fro displacement of the nozzles 11 in the sense of the double arrow P in FIG. 1 the lobes 12 of the main solder wave 15 can be continuously displaced to and fro in the transverse direction. This has the advantage that even neighbouring locations of the workpiece are be reliably engaged by the solder and that air pockets are removed without the adhesion being interrupted. The frequency of the lateral movement must be matched to the speed at which the workpieces 29 are conveyed in such a way that the underside of the workpiece 29 is completely wetted with solder.

A further variant is illustrated in broken lines in FIG. 1. This variant consists of a slider 10 which is arranged beneath the openings of the solder outlet nozzles 11 and which has openings 9 arranged at suitable distances from one another. The slider 10 can be displaced to and fro in the direction of the double arrow F. In the illustrated position the first, third and fifth openings 9 of the slider 10 are aligned with the solder outlet nozzles 11 so that solder can only emerge from these solder outlet nozzles, whereas the second and fourth solder outlet nozzles 11 are blocked. If the slider 10 is now displaced to the left the first, third and fifth solder outlet nozzles 11 are progressively supplied with lesser quantities of solder whereas the second and fourth solder outlet nozzles are progressively opened so that continually increasing quantities of solder are supplied to these nozzles. In this manner the transverse arrangement of lobes 12 is moved laterally in wave-like manner which is likewise useful for the avoidance of air inclusions. The transverse movement in the direction of the arrow P is preferably used in combination with the wave modulation in accordance with the double arrow F.

In place of a slider 10 as illustrated in broken lines it would also be possible to use a continuously rotating and correspondingly constructed screw or another periodically operating blocking element.

In distinction to the illustration of FIGS. 1 and 2 it is also possible to arrange several solder outlet nozzles 11 one behind the other in the conveying direction in order to favour the uniformity of the soldering.

As seen in FIG. 2 the arrangement of auxiliary solder nozzles 11 can also be pivoted about an axis 16 standing at right angles to the plane of the drawing of FIG. 2, in the sense of the double arrow f, whereby the lobes 12 generated by the nozzles 11 on the main solder wave 15 can be appropriately modified.

In corresponding manner the main solder system 23 can also be pivoted about the axis 16, or about another axis, in the sense of the double arrow G, whereby a further matching to various soldering problems is possible.

It is also possible, as shown in FIG. 2, to direct the conveying path 26 for the workpiece 29 obliquely upwards or downwards in order to ensure an ideal matching to the modulated surface 12 of the solder wave 15.

Figure 3:
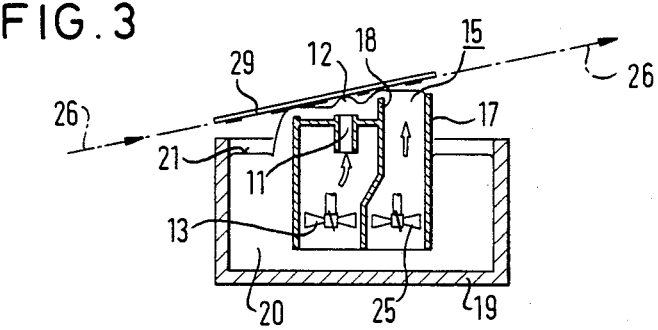
Figure 4:
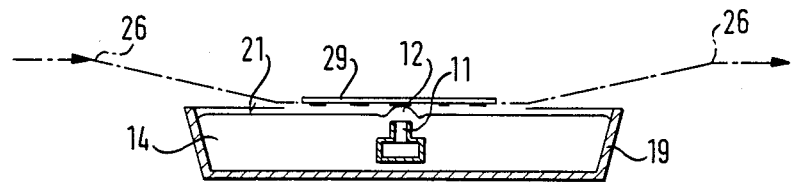

In FIG. 3 the auxiliary solder nozzles 11 are arranged in front of and somewhat below the main solder nozzle 17. Between the main and auxiliary solder nozzles 17 and 11 there is located a cascade-like wall 18 which lies somewhat lower than the other wall of the main solder nozzle 17 in the conveying direction so that the solder expelled from the main solder nozzle 17 via the pump aggregate 25 flows back to the solder melt 20 over the auxiliary solder nozzle 11, and indeed in the opposite direction to the direction in which the workpiece is conveyed.

The solder expelled by the pump aggregate 13 from the top of the nozzle 11 once again generated lobes 12 on the solder wave 11 which have markedly curved convex surfaces and which thus enable improved soldering at the lower side of the workpiece 29.

Attention should be drawn to the fact that in FIG. 3, at the location where the workpiece 29 separates from the main solder wave 15, the main solder wave 15 emerging from the main solder outlet nozzle 17 can flow very calmly so that the required sharpness of the contours is ensured.

On the other hand the corresponding higher speed of the solder emerging from the solder outlet nozzles 11 can generate considerable turbulence in the actual soldering region which substantially favours the wetting of the lower surface of the workpiece.

It is also possible to fixedly position the workpieces above the apparatus of the invention and a movable arrangement of the nozzles has then shown itself to be particularly favourable. It is however preferable—as illustrated in the drawings—to move the workpieces above the apparatus of the invention by means of a transport system.

What is claimed is:

1. Apparatus for soldering workpieces as the workpieces are conveyed past the apparatus along a conveying path in a conveying direction, the apparatus comprising:
   a main solder melt having a workpiece contacting surface;
   a first solder nozzle fluidly coupled to said main solder melt;
   means for varying the angular position of the first solder nozzle relative to the solder melt; and
   means for pumping solder through said first solder nozzle to create a generally semi-spherical solder surface in said workpiece contacting surface of said solder melt.

2. The apparatus of claim 1 wherein said first solder nozzle has an upper end spaced apart below said solder melt workpiece contacting surface.

3. The apparatus of claim 1 wherein said pumping means sucks solder through said first solder nozzle so said semi-spherical solder surface is a downwardly extending convex depression.

4. The apparatus of claim 1 wherein said pumping means pushes solder through said first solder nozzle so said semi-spherical solder surface is an upwardly extending convex projection.

5. The apparatus of claim 1 further comprising several first solder nozzles arranged spaced apart in a row.

6. The apparatus of claim 5 wherein the semi-spherical solder surfaces created by said several first nozzles are in a straight row.

7. The apparatus of claim 6 wherein the row of semi-spherical solder surfaces extends at substantially a right angle to the conveying direction.

8. The apparatus of claim 1 further comprising means for modulating said semi-spherical solder surface independently of the basic shape of the workpiece contacting surface.

9. The apparatus of claim 5 further comprising:
   means for forming a main solder wave at said main solder melt; and wherein
   said row extends at substantially a right angle to the conveying direction.

10. The apparatus of claim 1 further comprising:
    means for forming a main solder wave at said main solder melt; and
    means for varying the angle of the main solder wave independently of the first solder nozzle.

11. Apparatus of claim 1 further comprising a main solder nozzle.

12. The apparatus of claim 11 further comprising a main solder pump for pumping solder through said main solder nozzle to create a main solder wave, said main solder wave including said workpiece contacting surface.

13. The apparatus of claim 11 wherein the auxiliary solder nozzle is arranged within the main solder nozzle.

14. The apparatus of claim 11 wherein said main and auxiliary nozzles are arranged side by side along said conveying direction.

15. The apparatus of claim 14 wherein said main solder nozzle is at a higher elevation than said auxiliary solder nozzle so said main solder wave flows over said auxiliary solder nozzle.

16. The apparatus of claim 11 wherein the main solder nozzle generates a uniform, calmed main solder wave which has a constant and reproducable breakaway edge at the workpiece.

17. The apparatus of claim 1 wherein:
    said main solder melt is a passive solder melt; and further comprising
    a plurality of first solder nozzles within said passive solder melt arranged in a row spaced apart from one another, the row extending substantially at a right angle to the conveying direction.

18. The apparatus of claim 17 including means for movably mounting the row of first solder nozzles for horizontal displacement transverse to the conveying direction.

19. The apparatus of claim 1 wherein the first solder nozzle produces turbulent flow at a modulation region of said solder melt workpiece contacting surface.

20. The apparatus of claim 1 wherein the solder pumping means periodically varies the amplitude of the lobe.

21. The apparatus of claim 20 further comprising:
    a plurality of first nozzles and semi-spherical solder surface; and wherein
    said pumping means asynchronously pumps solder through said first nozzles so to produce a wave-like movement of the semi-spherical solder surfaces in a lateral direction transverse to the conveying direction.

22. The apparatus of claim 12 wherein the main solder wave and semi-spherical solder surface are arranged relative to each other and the conveying path so the workpiece serially contacts the main solder wave and the solder lobe.

23. The apparatus of claim 22 wherein said workpiece contacts said main solder wave before contacting said semi-spherical solder surface.

24. The apparatus of claim 22 wherein said workpiece contacts said main solder wave before and after contacting said semi-spherical solder surface.

25. Apparatus for soldering workpieces as the workpieces are conveyed past the apparatus along a conveying path in a conveying direction, the apparatus comprising:
- a main solder melt;
- a main solder nozzle fluidly coupled to said main solder melt;
- first means for pumping solder through said main solder nozzle to create a main solder wave having a workpiece contacting surface;
- a plurality of auxiliary solder nozzles fluidly coupled to said main solder melt, said auxiliary solder nozzles having upper ends positioned below at least a portion of said workpiece contacting surface; and
- a second means for pumping solder through said auxiliary solder nozzles to create generally semi-spherical solder lobes in said workpiece contacting surface of said solder melt.

26. The apparatus of claim 25 further comprising:
- means for varying the angle of the auxiliary solder nozzle relative to the solder melt; and
- means for varying the angle of the main solder nozzle relative to the solder melt and independently of the auxiliary solder nozzle.

27. The apparatus of claim 25 including means for movably mounting said auxiliary solder nozzles for horizontal displacement transverse to the conveying direction.

28. The apparatus of claim 25 wherein the solder pumping means periodically varies the amplitude of the lobe.

29. Apparatus for soldering workpieces as the workpieces are conveyed past the apparatus along a conveying path in a conveying direction, the apparatus comprising:
- a main solder melt having a workpiece contacting surface;
- a main solder nozzle, fluidly coupled to said main solder melt, through which solder is pumped to create a main solder wave;
- an auxiliary solder nozzle fluidly coupled to said main solder melt, the auxiliary solder nozzle being arranged within the main solder nozzle; and
- means for pumping solder through said auxiliary solder nozzle to create a generally semi-spherical solder surface in said workpiece contacting surface of said solder melt.

30. Apparatus for soldering workpieces as the workpieces are conveyed past the apparatus along a conveying path in a conveying direction, the apparatus comprising:
- a main solder melt having a workpiece contacting surface;
- a main solder nozzle, fluidly coupled to said main solder melt, through which solder is pumped to create a main solder wave;
- an auxiliary solder nozzle fluidly coupled to said main solder melt;
- means for pumping solder through said auxiliary solder nozzle to create a generally semi-spherical solder surface in said workpiece contacting surface of said solder melt; and
- said main and auxiliary nozzles being arranged side by side along said conveying direction with said main solder nozzle at a higher elevation than said auxiliary solder nozzle so said main solder wave flows over said auxiliary solder nozzle.

31. Apparatus for soldering workpieces as the workpieces are conveyed past the apparatus along a conveying path in a conveying direction, the apparatus comprising:
- a passive solder melt having a workpiece contacting surface;
- a plurality of auxiliary solder nozzles, fluidly coupled to said passive solder melt, arranged in a row spaced apart from one another, the row extending substantially at a right angle to the conveying direction;
- means for movably mounting the row of auxiliary solder nozzles for horizontal displacement transverse to the conveying direction; and
- means for pumping solder through said auxiliary solder nozzle to create a generally semi-spherical solder surface in said workpiece contacting surface of said solder melt.

* * * * *